(12) United States Patent
Abe et al.

(10) Patent No.: US 10,833,358 B2
(45) Date of Patent: Nov. 10, 2020

(54) POROUS CARBON HAVING CONNECTING MESOPORES AND ELECTRODE

(71) Applicants: Naoto Abe, Shizuoka (JP); Yoshio Itoh, Shizuoka (JP); Tatsuya Dan, Shizuoka (JP); Yuka Araki, Shizuoka (JP); Shuhei Takeshita, Shizuoka (JP)

(72) Inventors: Naoto Abe, Shizuoka (JP); Yoshio Itoh, Shizuoka (JP); Tatsuya Dan, Shizuoka (JP); Yuka Araki, Shizuoka (JP); Shuhei Takeshita, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/599,534

(22) Filed: Oct. 11, 2019

(65) Prior Publication Data

US 2020/0044277 A1  Feb. 6, 2020

Related U.S. Application Data

(63) Continuation of application No. 15/683,908, filed on Aug. 23, 2017, now Pat. No. 10,490,846, which is a (Continued)

(30) Foreign Application Priority Data

Mar. 11, 2015  (JP) ............................. 2015-048263

(51) Int. Cl.
   *H01M 10/00* (2006.01)
   *H01M 10/056* (2010.01)
   (Continued)

(52) U.S. Cl.
   CPC .......... *H01M 10/056* (2013.01); *H01G 11/04* (2013.01); *H01G 11/24* (2013.01);
   (Continued)

(58) Field of Classification Search
   CPC ........ H01G 11/26; H01G 11/32; H01G 11/06; H01M 10/056; H01M 10/052; H01M 10/0569; C01B 32/60; Y02E 60/13
   See application file for complete search history.

(56) References Cited

U.S. PATENT DOCUMENTS

2003/0143457 A1  7/2003  Kashino et al.
2006/0269834 A1  11/2006  West et al.
(Continued)

FOREIGN PATENT DOCUMENTS

EP  1 860 673 A1  11/2007
EP  1 895 553 A1  3/2008
(Continued)

OTHER PUBLICATIONS

International Search Report dated Apr. 26, 2016 for counterpart International Patent Application No. PCT/JP2016/053291 filed Feb. 3, 2016 ( with English Translation).
(Continued)

*Primary Examiner* — Cynthia H Kelly
*Assistant Examiner* — Monique M Wills
(74) *Attorney, Agent, or Firm* — Oblon, McClelland, Maier & Neustadt, L.L.P.

(57) ABSTRACT

To provide a non-aqueous electrolyte electricity-storage element including a positive electrode including a positive-electrode active material capable of inserting and releasing anions, a negative electrode including a negative-electrode active material capable of inserting and releasing cations, and a non-aqueous electrolyte, wherein the positive-electrode active material is porous carbon having pores having a three-dimensional network structure, and wherein a changing rate of a cross-sectional thickness of a positive electrode film including the positive-electrode active material defined by Formula (1) below is less than 45%.

6 Claims, 2 Drawing Sheets

Related U.S. Application Data continuation of application No. PCT/JP2016/053291, filed on Feb. 3, 2016.

(51) Int. Cl.

| | | |
|---|---|---|
| *H01M 4/133* | (2010.01) | |
| *H01G 11/32* | (2013.01) | |
| *H01G 11/24* | (2013.01) | |
| *H01G 11/04* | (2013.01) | |
| *H01M 4/587* | (2010.01) | |
| *H01G 11/50* | (2013.01) | |
| *H01M 10/052* | (2010.01) | |
| *H01M 10/0569* | (2010.01) | |
| *H01G 11/26* | (2013.01) | |
| *H01M 10/0525* | (2010.01) | |
| *H01G 11/06* | (2013.01) | |
| *H01G 11/62* | (2013.01) | |
| *H01G 11/60* | (2013.01) | |
| *C01B 32/60* | (2017.01) | |

(52) U.S. Cl.
CPC .............. *H01G 11/26* (2013.01); *H01G 11/32* (2013.01); *H01G 11/50* (2013.01); *H01M 4/133* (2013.01); *H01M 4/587* (2013.01); *H01M 10/052* (2013.01); *H01M 10/0525* (2013.01); *H01M 10/0569* (2013.01); *C01B 32/60* (2017.08); *H01G 11/06* (2013.01); *H01G 11/60* (2013.01); *H01G 11/62* (2013.01); *Y02E 60/13* (2013.01)

(56) References Cited

U.S. PATENT DOCUMENTS

| | | |
|---|---|---|
| 2007/0099088 A1 | 5/2007 | Kwon et al. |
| 2007/0172741 A1 | 7/2007 | Saito |
| 2008/0055819 A1 | 3/2008 | Taguchi et al. |
| 2009/0126172 A1 | 5/2009 | Kobayashi et al. |
| 2009/0246624 A1 | 10/2009 | Kojima et al. |
| 2009/0253033 A1 | 10/2009 | Hirose et al. |
| 2009/0291368 A1* | 11/2009 | Newman ........... H01M 10/0525 429/245 |
| 2009/0305135 A1 | 12/2009 | Shi |
| 2011/0014358 A1 | 1/2011 | Kojima et al. |
| 2012/0070708 A1 | 3/2012 | Ohira |
| 2012/0189920 A1 | 7/2012 | Li et al. |
| 2013/0271085 A1 | 10/2013 | Chen |
| 2013/0330504 A1 | 12/2013 | Morishita |
| 2014/0030599 A1 | 1/2014 | Lee et al. |
| 2014/0170507 A1 | 6/2014 | Matsui et al. |
| 2016/0301105 A1 | 10/2016 | Li et al. |

FOREIGN PATENT DOCUMENTS

| | | |
|---|---|---|
| EP | 2 105 985 A1 | 9/2009 |
| JP | 08-031404 | 2/1996 |
| JP | 2003-132943 A | 5/2003 |
| JP | 2008-543002 | 11/2008 |
| JP | 4314087 | 5/2009 |
| JP | 2010-095390 | 4/2010 |
| JP | 2010-129363 | 6/2010 |
| JP | 4569126 | 8/2010 |
| JP | 4998358 | 5/2012 |
| JP | 2012-195563 | 10/2012 |
| JP | 2013-065534 | 4/2013 |
| JP | 5340737 | 8/2013 |
| JP | 5399185 | 11/2013 |
| JP | 2014-026949 | 2/2014 |
| JP | 2014-096528 | 5/2014 |
| JP | 2016-046287 | 4/2016 |
| JP | 2016-058207 | 4/2016 |
| JP | 2016-091652 | 5/2016 |
| WO | WO 02/017428 A1 | 2/2002 |
| WO | WO 2013/157187 A1 | 10/2013 |

OTHER PUBLICATIONS

Written Opinion dated Apr. 26, 2016 for counterpart International Patent Application No. PCT/JP2016/053291 filed Feb. 3, 2016.
Extended European Search Report dated May 3, 2018 in Patent Application No. 16761395.9.

* cited by examiner

POROUS CARBON HAVING CONNECTING MESOPORES AND ELECTRODE

CROSS-REFERENCE TO RELATED APPLICATIONS

The present application is a continuation application of U.S. patent application Ser. No. 15/683,908 filed Aug. 23, 2017, which in turn is a continuation application of International Application No. PCT/JP2016/053291, filed Feb. 3, 2016, which claims priority to Japanese Patent Application No. 2015-048263, filed Mar. 11, 2015. The contents of these applications are incorporated herein by reference in their entirety.

BACKGROUND OF THE INVENTION

Field of the Invention

The present disclosure relates to a non-aqueous electrolyte electricity-storage element.

Description of the Related Art

In recent years, properties of non-aqueous electrolyte electricity-storage elements having high energy densities have been improved and the non-aqueous electrolyte electricity-storage elements have been widely used to correspond to reduction in sizes and improvements in performances of mobile devices. Moreover, developments of non-aqueous electrolyte electricity-storage elements having the larger capacities and having excellent safety have been conducted and it has been started that the above-described non-aqueous electrolyte electricity-storage elements are mounted in electric cars.

As the non-aqueous electrolyte electricity-storage element, various lithium ion secondary cells are used. The lithium ion secondary cell includes a positive electrode formed of lithium-cobalt complex oxide etc., a negative electrode formed of carbon, and a non-aqueous electrolyte formed by dissolving a lithium salt in a non-aqueous solvent. At the time of charging the lithium ion secondary cell, lithium inside the positive electrode is released from the positive electrode and inserted into the carbon of the negative electrode, and at the time of discharging the lithium ion secondary cell, the lithium inserted into the negative electrode is released to return to the composite oxide of the positive electrode, to thereby perform charge and discharge of the lithium ion secondary cell.

In a case where $LiPF_6$ is used as a lithium salt, as represented by the following reaction formula, charge is performed by inserting $PF_6^-$ from a non-aqueous electrolyte into a positive electrode and inserting $Li^+$ from the non-aqueous electrolyte into the negative electrode, and discharge is performed by releasing $PF_6^-$, from the positive electrode to the non-aqueous electrolyte and releasing $Li^+$ from the negative electrode to the non-aqueous electrolyte.

$PF_6^- + nC \rightleftarrows C_n(PF_6) + e^-$  Positive electrode $Li^+ + nC + e^- \rightleftarrows LiC_n$  Negative electrode ⟶ charging reaction
⟵---- discharge reaction Known as an active material capable of inserting and releasing anions are using black lead to insert and release anions to intercalation of the black lead as disclosed in Japanese Patent No. 4569126 and Japanese Patent No. 4314087, using absorption and detachment of anions to a surface of a carbon material a BET specific surface area of which is increased to a certain degree by alkali activation as disclosed in Japanese Patent No. 5399185, and using absorption and detachment of anions to activated carbon having a large BET specific surface area as disclosed in Japanese Unexamined Patent Application Publication No. 2012-195563. Use of black lead that can utilize insertion and release of anions to intercalation can increase a specific capacity per a unit mass of the active material.

When a highly graphitized artificial black lead or natural black lead material is used as a positive-electrode active material, black lead crystals are collapsed (cleaved) as anions are electrochemically accumulated to the black lead material. Therefore, a capacity of reversible accumulation and release of anions is decreased by repeatedly performing charge and discharge.

SUMMARY OF THE INVENTION

According to one aspect of the present disclosure, a non-aqueous electrolyte electricity-storage element includes a positive electrode including a positive-electrode active material capable of inserting and releasing anions, a negative electrode including a negative-electrode active material capable of inserting and releasing cations, and a non-aqueous electrolyte. The positive-electrode active material is porous carbon having pores having a three-dimensional network structure. A changing rate of a cross-sectional thickness of a positive electrode film including the positive-electrode active material defined by Formula (1) below is less than 45%.

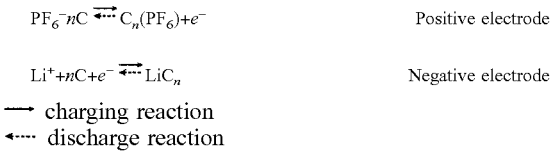

Formula (1)

DESCRIPTION OF THE EMBODIMENTS

Figure 1:
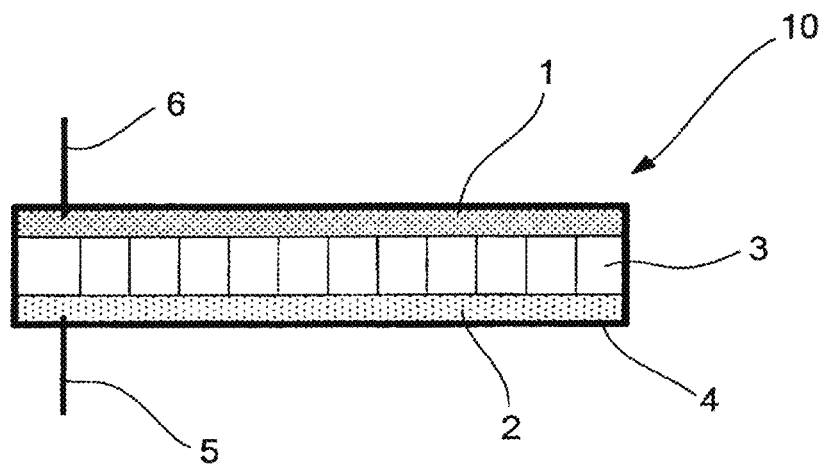
FIG. 1 is a schematic view illustrating one example of a non-aqueous electrolyte electricity-storage element of the present disclosure.

The present disclosure has an object to provide a non-aqueous electrolyte electricity-storage element that maintains a high energy density, inhibits expansion of an electrode, and has excellent cycle properties.

According to the present disclosure, a non-aqueous electrolyte electricity-storage element having the following properties can be provided.

(1) Having a high energy density.
(2) Capable of inhibiting expansion of a positive electrode.
(3) Capable of enhancing cycle properties.

(Non-Aqueous Electrolyte Electricity-Storage Element)

A non-aqueous electrolyte electricity-storage element of the present disclosure includes a positive electrode including a positive-electrode active material capable of inserting and releasing anions, a negative electrode including a negative-electrode active material capable of inserting and releasing cations, and a non-aqueous electrolyte. The positive-electrode active material is porous carbon having pores having a three-dimensional network structure. A changing rate of a cross-sectional thickness of a positive electrode film including the positive-electrode active material defined by Formula (1) below is less than 45%. The non-aqueous electrolyte electricity-storage element may further include other members according to the necessity.

$$\text{Changing rate of cross-sectional thickness} (\%) = \frac{\text{Film thickness after charge-discharge} - \text{Film thickness before charge-discharge}}{\text{Film thickness before charge-discharge}} \times 100 \quad \text{Formula (1)}$$

The non-aqueous electrolyte electricity-storage element of the present disclosure has been accomplished based on the finding described below. The invention disclosed in PTL 2 is to provide an electrochemical capacitor that has an excellent energy density and improved cycle durability with using, as a positive-electrode active material, soft carbon subjected to an activation treatment with KOH to give fine pores at the surface. Moreover, the invention disclosed in PTL 2 is a technology associated with an electrochemical capacitor, and uses surface adsorption of ions and therefore cleavage of the carbon does not occur. As a BET specific surface area of the positive-electrode active material increases, however, decomposition of an electrolyte etc. tends to occur. Therefore, voltage cannot be set very high, and to 4.8 V at the highest. Moreover, accumulation of anions into the positive electrode cannot be utilized. Accordingly, a capacity of the capacitor cannot be sufficiently increased.

In an anion intercalation electricity-storage element, an electrode largely expands or contracts through charge and discharge to thereby change a thickness of a positive electrode film. Then, compression stress or tensile stress is generated within the electricity-storage element depending on a changing rate of the film thickness of the positive electrode, and cracking in the positive electrode material may formed, the positive electrode material and a separator may be squashed, the positive electrode material may be peeled from a positive electrode collector, and moreover a space may be formed between the positive electrode or the negative electrode and the separator, as cycles are repeated, and as a result, a liquid shortage of a non-aqueous electrolyte is caused to inhibit a reaction of the electricity-storage element. Accordingly, a changing rate of a cross-sectional thickness of the positive electrode film affects a service life of the electricity-storage element.

In the present disclosure, a combination of charge and discharge under certain conditions is regarded as 1 cycle, and a changing rate of a cross-sectional thickness of the positive electrode film including the positive-electrode active material before and after a charge-discharge test performed up to 50th cycle, where the changing rate is defined by Formula (1) below, is less than 45% and is preferably 20% or less. When the changing rate of the cross-sectional thickness is less than 45%, cycle properties are improved.

$$\text{Changing rate of cross-sectional thickness} (\%) = \frac{\text{Film thickness after charge-discharge} - \text{Film thickness before charge-discharge}}{\text{Film thickness before charge-discharge}} \times 100 \quad \text{Formula (1)}$$

However, the cross-sectional film thickness of the positive electrode film is an average value of a thickness measured at randomly selected 3 points on the positive electrode film using, for example, a digital gage (DG-205, available from OZAKI MFG. CO., LTD.).

A discharge capacity of the non-aqueous electrolyte electricity-storage element is preferably 50 mAh/g or greater but 140 mAh/g or less under charge-discharge conditions of the non-aqueous electrolyte electricity-storage element in view of both a high capacity and a cycle service life.

<Positive Electrode>

The positive electrode is not particularly limited and may be appropriately selected depending on the intended purpose, as long as the positive electrode includes a positive-electrode active material. Examples of the positive electrode include a positive electrode in which a positive electrode material including a positive-electrode active material is disposed on a positive electrode collector.

A shape of the positive electrode is not particularly limited and may be appropriately selected depending on the intended purpose. Examples of the shape include plate shapes and spherical shapes.

—Positive Electrode Material—

The positive electrode material is not particularly limited and may be appropriately selected depending on the intended purpose. For example, the positive electrode material includes at least a positive-electrode active material, and may further include a conduction auxiliary agent, a binder, a thickening agent, etc., according to the necessity.

——Positive-Electrode Active Material——

As the positive-electrode active material, porous carbon having communicating pores "mesopores" of a three-dimensional network structure is used. The "positive-electrode active material having communicating mesopores of a three-dimensional network structure" is a capacitor, in which an electric double layer is formed by a pair of positive and negative electrolyte ions that are present over both sides of a face where mesopores (void areas) and a carbon material area are in contact with each other. Therefore, it can be understood that movements of electrolyte ions present as a pair are faster than the movements of electrolyte ions generated after a sequential chemical reaction with an electrode active material, and an ability of supplying electricity depends on, not only a size of a volume of the void areas, but also a size of a surface area of mesopores, which allows a pair of positive and negative electrolyte ions to be present.

Considering crystallinity of the porous carbon, the time constant (slow response during charge and discharge) of the capacitor depends on, not only capacitance of a non-aqueous electrolyte, but also a resistance value of the carbon material area, with which the electrolyte forms an ohmic contact. Since both electrolyte ions perform chemical reactions, in which binding and separation with the electrode active materials are repeated, moreover, there is a possibility that the porous carbon is deteriorated. The crystallinity of the porous carbon is preferably appropriately determined so as to have strength resistant to the above-described deterioration.

Note that, it is not necessary to have a crystalline structure in the entire area of the carbon material. An amorphous part may be present at part of the porous carbon, or the entire porous carbon may be amorphous.

In the porous carbon, presence of mesopores is essential but presence of micropores is not essential. Accordingly, micropores may be present or may not be present, but at the time of carbonization, an organic material serving as a starting material of the carbon material typically releases a volatile material to carbonize. Accordingly, micropores are typically left as release marks, and therefore it is difficult to obtain a carbon material, which does not have micropores at all. On the other hand, mesopores are typically intentionally formed. As it has been known in the art, for example, it is often a case where a mark-forming material of an acid (alkali)-soluble metal, metal oxide, metal salts, or metal-containing organic material, and a carbon material or an organic material that is a raw material of the carbon material are shaped together, then the mark-forming material is dissolved with acid (alkali), and the marks left become mesopores.

In the present specification, pores having diameters of less than 2 nm are referred to as micropores, and pores having diameters of 2 nm or greater but 50 nm or less are referred to as mesopores. Since a size of the electrolyte ion is 0.5 nm or greater but 2 nm or less, it cannot be said that the micropores significantly contribute to movements of the ions. Accordingly, the presence of mesopores is important for smooth movements of the ions. For comparison, a size of pores in activated carbon, which is also a carbonaceous material, is known to be about 1 nm on average. In case of the activated carbon, it is regarded as one of adsorptions all of which generate heat (reduction in enthalpy) without exceptions.

The mesopores in the above-mentioned size preferably constitute a three-dimensional network structure. When the pores constitute a three-dimensional network structure, ions move smoothly.

A BET specific surface area of the porous carbon is preferably 50 $m^2/g$ or greater. When the BET specific surface area is 50 $m^2/g$ or greater, a sufficient amount of pores is formed and insertion of ions is sufficiently performed, hence a capacity of a resultant electricity-storage element can be made high.

On the other hand, a BET specific surface area of the porous carbon is preferably 2,000 $m^2/g$ or less. When the BET specific surface area is 2,000 $m^2/g$ or less, mesopores are sufficiently formed, insertion of ions is not inhibited, and therefore a high capacity can be obtained.

The BET specific surface area is more preferably 800 $m^2/g$ or greater but 1,800 $m^2/g$ or less.

For example, the BET specific surface area can be measured by gas adsorption, etc.

The mesopores are open pores and preferably have a structure where pore areas communicate. With such a structure, ions are smoothly moved.

A pore volume of the porous carbon measured by the BJH method is preferably 0.2 mL/g or greater but 2.3 mL/g or less, and more preferably 0.2 mL/g or greater but 1.7 mL/g or less. When the pore volume is 0.2 mL/g or greater, mesopores rarely become independent pores in which communicating areas of the mesopores are blocked, and a large discharge capacity can be obtained without inhibiting movements of ions. When the pore volume is 2.3 mL/g or less, on the other hand, reduction in density as an electrode caused because the carbon is bulky can be prevented and hence reduction in a capacity per unit volume can be prevented. Moreover, deterioration of cycle properties can be prevented where the cycle properties are deteriorated because carbonaceous walls constituting the pores become thin and shapes of the carbonaceous wall cannot be maintained after insertion and release of ions are repeated.

For example, the pore volume can be measured by the BJH (Barrett, Joyner, Hallender) method according to gas adsorption.

——Binder and Thickening Agent——

The binder and the thickening agent are not particularly limited and may be appropriately selected depending on the intended purpose, as long as the binder and the thickening agent are materials stable to a solvent used during production of an electrode or an electrolyte, or potential applied. Examples of the binder and the thickening agent include: fluorine-based binders, such as polyvinylidene fluoride (PVDF) and polytetrafluoroethylene (PTFE); ethylene-propylene-butadiene rubber (EPBR); styrene-butadiene rubber (SBR); isoprene rubber; acrylate-based latex; carboxymethyl cellulose (CMC); methyl cellulose; hydroxylmethyl cellulose; ethyl cellulose; polyacrylic acid; polyvinyl alcohol; aliginic acid; oxidized starch; starch phosphate; and casein. These may be used alone or in combination. Among them, fluorine-based binders, such as polyvinylidene fluoride (PVDF) and polytetrafluoroethylene (PTFE), acrylate-based latex, and carboxymethyl cellulose (CMC) are preferable.

——Conduction Auxiliary Agent——

Examples of the conduction auxiliary agent include: metal materials, such as copper and aluminium; and carbonaceous materials, such as carbon black, acetylene black, and carbon nanotubes. These may be used alone or in combination.

—Positive-Electrode Collector—

A material, shape, size, and structure of the positive-electrode collector are not particularly limited and may be appropriately selected depending on the intended purpose.

A material of the positive-electrode collector is not particularly limited and may be appropriately selected depending on the intended purpose, as long as the material is formed of a conductive material and is stable against applied potential. Examples of the material of the positive-electrode collector include stainless steel, nickel, aluminium, titanium, and tantalum. Among them, stainless steel and aluminium are particularly preferable.

A shape of the positive-electrode collector is not particularly limited and may be appropriately selected depending on the intended purpose.

A size of the positive-electrode collector is not particularly limited and may be appropriately selected depending on the intended purpose, as long as the size is a size usable for a non-aqueous electrolyte electricity-storage element.

<Production Method of Positive Electrode>

As the positive electrode, a film of a positive electrode including a positive-electrode active material can be produced by adding the binder, the thickening agent, the conductive auxiliary agent, a solvent, etc. according to the necessity, to the positive-electrode active material to form a positive electrode material in the form of slurry, applying the positive electrode material onto the positive electrode collector, and drying the applied positive electrode material. The solvent is not particularly limited and may be appropriately selected depending on the intended purpose. Examples of the solvent include aqueous solvents and organic solvents. Examples of the aqueous solvents include water and alcohol. Examples of the organic solvents include N-methyl-2-pyrrolidone (NMP) and toluene.

Note that, the positive electrode-active material may be subjected to roll molding as it is to form a sheet electrode, or to compression molding to form a pellet electrode.

<Negative Electrode>

The negative electrode is not particularly limited and may be appropriately selected depending on the intended purpose, as long as the negative electrode includes a negative-electrode active material. Examples of the negative electrode include a negative electrode in which a negative-electrode material including a negative-electrode active material is disposed on a negative-electrode collector.

A shape of the negative electrode is not particularly limited and may be appropriately selected depending on the intended purpose. Examples of the shape include a plate shape.

—Negative-Electrode Material—

The negative-electrode material includes at least a negative-electrode active material, and may further include a conduction auxiliary agent, a binder, a thickening agent, etc., according to the necessity.

——Negative-Electrode Active Material——

The negative-electrode active material is not particularly limited as long as the negative-electrode active material is capable of inserting and releasing lithium ions at least in a non-aqueous solvent system. Specific examples of the negative-electrode active material include carbonaceous materials, metal oxides capable of inserting and releasing lithium, such as antimony-doped tin oxide and silicon monoxide, metals of metal alloys capable of forming an alloy with lithium, such as aluminium, thin, silicon, and zinc, composite alloy compounds each including a metal capable of forming an alloy with lithium, an alloy including the metal and lithium, and metal lithium nitride such as cobalt lithium nitride. These may be used alone or in combination. Among them, a carbonaceous material is particularly preferable in view of safety and a cost.

Examples of the carbonaceous material include: black lead (graphite), such as coke, artificial black lead, and natural black lead; and thermal decomposition products of organic materials under various thermal decomposition conditions. Among them, artificial black lead and natural black lead are particularly preferable.

——Binder and Thickening Agent——

The binder and the thickening agent are not particularly limited and may be appropriately selected depending on the intended purpose, as long as the binder and the thickening agent are materials stable to a solvent used during production of an electrode or an electrolyte, or potential applied. Examples of the binder and the thickening agent include: fluorine-based binders, such as polyvinylidene fluoride (PVDF) and polytetrafluoroethylene (PTFE); ethylene-propylene-butadiene rubber (EPBR); styrene-butadiene rubber (SBR); isoprene rubber; acrylate-based latex; carboxymethyl cellulose (CMC); methyl cellulose; hydroxylmethyl cellulose; ethyl cellulose; polyacrylic acid; polyvinyl alcohol; aliginic acid; oxidized starch; starch phosphate; and casein. These may be used alone or in combination. Among them, fluorine-based binders, such as polyvinylidene fluoride (PVDF) and polytetrafluoroethylene (PTFE), styrene-butadiene rubber (SBR), and carboxymethyl cellulose (CMC) are preferable.

——Conduction Auxiliary Agent——

Examples of the conduction auxiliary agent include: metal materials, such as copper and aluminium; and carbonaceous materials, such as carbon black, acetylene black, and carbon nanotubes. These may be used alone or in combination.

—Negative-Electrode Collector—

A material, shape, size and structure of the negative-electrode collector are not particularly limited and may be appropriately selected depending on the intended purpose.

A material of the negative-electrode collector is not particularly limited and may be appropriately selected depending on the intended purpose, as long as the material is formed of a conductive material and is stable against applied potential. Examples of the material include stainless steel, nickel, aluminium, and copper. Among them, stainless steel, copper, and aluminium are particularly preferable.

A shape of the collector is not particularly limited and may be appropriately selected depending on the intended purpose.

A size of the collector is not particularly limited and may be appropriately selected depending on the intended purpose, as long as the size is a size usable for a non-aqueous electrolyte electricity-storage element.

<Production Method of Negative Electrode>

The negative electrode can be produced by adding the binder, the thickening agent, the conduction auxiliary agent, a solvent, etc. according to the necessity, to the negative-electrode active material to form a negative electrode material in the form of slurry, applying the negative electrode material onto the negative electrode collector, and drying the applied negative electrode material. As the solvent, any of the solvents listed as examples of the solvent for use in the production method of the positive electrode can be used.

Moreover, the negative-electrode active material, to which the binder, the thickening agent, the conduction auxiliary agent, etc., are added, may be subjected to roll molding as it is to form a sheet electrode, or to compression molding to form a pellet electrode, or a method, such as vapor deposition, sputtering, and plating, to form a thin film of the negative-electrode active material on the negative electrode collector.

<Non-Aqueous Electrolyte>

The non-aqueous electrolyte is an electrolyte formed by dissolving an electrolyte salt in a non-aqueous solvent.

—Non-Aqueous Solvent—

The non-aqueous solvent is not particularly limited and may be appropriately selected depending on the intended purpose. The non-aqueous solvent is suitably an aprotic organic solvent.

As the aprotic organic solvent, a carbonate-based organic solvent, such as chain carbonate and cyclic carbonate, is used. The aprotic organic solvent is preferably a solvent of low viscosity. Among the above-listed solvents, chain carbonate is preferable because the chain carbonate has high solubility to an electrolyte salt. Among then, chain carbonate is preferable because the chain carbonate has a high dissolving power against an electrolyte salt.

Examples of the chain carbonate include dimethyl carbonate (DMC), diethyl carbonate (DEC), and methyl ethyl carbonate (EMC). Among them, dimethyl carbonate (DMC) is preferable.

An amount of the DMC is not particularly limited and may be appropriately selected depending on the intended purpose, but the amount of the DMC is preferably 70% by mass or greater relative to the non-aqueous solvent. When the amount of the DMC is 70% by mass or greater, even in a case where the rest of the solvent is the cyclic material having a high dielectric constant (e.g., cyclic carbonate and cyclic ester), an amount of a cyclic material having a high dielectric constant is not large, and therefore a viscosity does not become high even when a non-aqueous electrolyte of high concentration of 3 mol/L or greater is produced, hence problems, such as penetration of a non-aqueous electrolyte into an electrode and diffusion of ions, do not occur.

Examples of the cyclic carbonate include propylene carbonate (PC), ethylene carbonate (EC), butylene carbonate (BC), vinylene carbonate (VC), and fluoroethylene carbonate (FEC).

When ethylene carbonate (EC) as the cyclic carbonate and dimethyl carbonate (DMC) as the chain carbonate are used in combination as a mixed solvent, a blending ratio between ethylene carbonate (EC) and dimethyl carbonate (DMC) is not particularly limited and may be appropriately selected depending on the intended purpose. A mass ratio (EC:DMC) is preferably from 3:10 through 1:99 and more preferably from 3:10 through 1:20.

As the non-aqueous solvent, ester-based organic solvents, such as cyclic ester and chain ester, and ether-based organic solvents, such as cyclic ether and chain ether, may be used according to the necessity.

Examples of the cyclic ester include γ-butyrolactone (γ-BL), 2-methyl-γ-butyrolactone, acetyl-γ-butyrolactone, and γ-valerolactone.

Examples of the chain ester include alkyl propionate, dialkyl malonate, alkyl acetate (methyl acetate (MA), ethyl acetate, etc.), and alkyl formate (methyl formate (ME), ethyl formate, etc.).

Examples of the cyclic ether include tetrahydrofuran, alkyltetrahydrofuran, alkoxy tetrahydrofuran, dialkoxy tetrahydrofuran, 1,3-dioxolan, alkyl-1,3-dioxolan, and 1,4-dioxolan.

Examples of the chain ether include 1,2-dimethoxyethane (DME), diethyl ether, ethylene glycol dialkyl ether, diethylene glycol dialkyl ether, triethylene glycol dialkyl ether, and tetraethylene glycol dialkyl ether.

—Electrolyte Salt—

A lithium salt is used as the electrolyte salt. The lithium salt is not particularly limited as long as the lithium salt is dissolved in a non-aqueous solvent to exhibits high ion conductivity. Examples of the lithium salt include lithium hexafluorophosphate ($LiPF_6$), lithium perchlorate ($LiClO_4$), lithium chloride (LiCl), lithium fluoroborate ($LiBF_4$), lithium hexafluoroarsenate ($LiAsF_6$), lithium trifluoromethanesulfonate ($LiCF_3SO_3$), lithium bistrifluoromethylsulfonyl imide ($LiN(CF_3SO_2)_2$), and lithium bisperfluoroethylsulfonyl imide ($LiN(C_2F_5SO_2)_2$). These may be used alone or in combination. Among them, $LiPF_6$ is particularly preferable because of a large amount of anions accumulated in a carbon electrode.

A concentration of the electrolyte salt is not particularly limited and may be appropriately selected depending on the intended purpose. The concentration of the electrolyte salt in the non-aqueous solvent is preferably 0.5 mol/L or greater but 6 mol/L or less, and more preferably 2 mol/L or greater but 4 mol/L or less in view of both a capacity and output of the electricity-storage element.

<Separator>

The separator is disposed between the positive electrode and the negative electrode for preventing a short circuit between the positive electrode and the negative electrode.

A material, shape, size, and structure of the separator is not particularly limited and may be appropriately selected depending on the intended purpose.

Examples of a material of the separator include: paper such as Kraft paper, vinylon blended paper, and synthetic pulp blended paper; cellophane; polyethylene graft membranes; polyolefin nonwoven fabric, such as polypropylene melt-flow nonwoven fabric; glass fiber nonwoven fabric; and micropore membranes. These may be used alone or in combination. Among them, a material having a porosity of 50% or greater is preferable in view of retention of an electrolyte.

As the shape of the separator, a nonwoven fabric is more preferable than a thin film-type having fine pores (micropores) because the nonwoven fabric has a high porosity.

A thickness of the separator is preferably 20 μm or greater in view of prevention of a short circuit and retention of an electrolyte.

A size of the separator is not particularly limited and may be appropriately selected depending on the intended purpose, as long as the size is a size usable for the non-aqueous electrolyte electricity-storage element.

A structure of the separator may be a single-layer structure or a laminate structure.

<Production Method of Non-Aqueous Electrolyte Electricity-Storage Element>

A non-aqueous electrolyte electricity-storage element of the present disclosure can be produced by assembling the positive electrode, the negative electrode, the non-aqueous electrolyte, and optionally a separator into an appropriate shape. Moreover, other constitutional members, such as an outer tin, can be used according to the necessity. A method for assembling the non-aqueous electrolyte electricity-storage element is not particularly limited and may be appropriately selected from methods typically used.

A shape of the non-aqueous electrolyte electricity-storage element of the present disclosure is not particularly limited and may be appropriately selected from various shapes typically used depending on the intended use. Examples of the shape include a cylinder-type where sheet electrodes and a separator are spirally disposed, a cylinder-type having an inside-out structure where pellet electrodes and a separator are combined, and a coin-type where pellet electrodes and a separator are laminated.

Here, FIG. 1 is a schematic view illustrating one example of a non-aqueous electrolyte electricity-storage element of the present disclosure. The non-aqueous electrolyte electricity-storage element 10 illustrated in FIG. 1 includes, inside an outer tin 4, a positive electrode 1, a negative electrode 2, and a separator 3 including the non-aqueous electrolyte. To the non-aqueous electrolyte electricity-storage element, a negative-electrode lead-out line 5 and a positive-electrode lead-out line 6 are disposed.

<Use>

Use of the non-aqueous electrolyte electricity-storage element of the present disclosure is not particularly limited and the non-aqueous electrolyte electricity-storage element can be used for various types of use. Examples of the use of the non-aqueous electrolyte electricity-storage element include power sources or back-up power sources for laptop computers, stylus-operated computers, mobile computers, electronic book players, mobile phones, mobile facsimiles, mobile photocopiers, mobile printers, headphone stereos, video movie players, liquid crystal televisions, handy cleaners, portable CD players, minidisk players, transceivers, electronic organizers, calculators, memory cards, mobile tape recorders, radios, motors, lighting equipment, toys, game equipment, clocks, strobes, and cameras.

EXAMPLES

Examples of the present disclosure will be described hereinafter, but the present disclosure should not be construed as being limited to these Examples.

Example 1

<Production of Positive Electrode>

Carbon A (amorphous CNOVEL, available from Toyo Tanso Co., Ltd.) serving as a positive-electrode active material, acetylene black (Denka Black powder, available from Denka Company Limited) serving as a conduction auxiliary agent, acrylate-based latex (TRD202A, available from JSR Corporation) serving as a binder, and carboxymethyl cellulose (DAICEL 1270, available from Daicel Corporation) serving as a thickening agent were mixed in a manner that a mass ratio of the mixture based on each of the solid contents was to be 100:7.5:3.0:9.5. Water was added to the resultant mixture to adjust the viscosity of the mixture to an appropriate degree, to thereby obtain a slurry. Subsequently, the obtained slurry was applied onto one side of an aluminium foil having a thickness of 20 μm using a doctor blade, and the applied slurry was dried followed by cutting out into a circle having a diameter of 16 mm to thereby obtain a positive electrode.

An average applied amount of the positive-electrode active material in the positive electrode film after drying was 2.3 mg/cm².

<Production of Electricity-Storage Element>

An electricity-storage element was produced using the Positive Electrode Above, 2 Sheets of Glass Filter Paper (GA100, available from ADVANTEC) each of which was cut out into a circle having a diameter of 16 mm as a separator, a lithium metal foil having a diameter of 16 mm as a negative electrode, and an EC/DMC/FEC (mass ratio: 2:96:2) mixed solution (available from KISHIDA CHEMICAL Co., Ltd.) including 2 mol/L of a LiPF$_6$ electrolyte as an electrolyte. Specifically, after vacuum drying the positive electrode and the separator for 4 hours at 150° C., a 2032 coin cell was assembled in a dry argon glove box.

<Evaluations of Electricity-Storage Element>

A charge-discharge test was performed by means of an automatic cell evaluation device (1024B-7V0.1A-4, available from Electro Field Co., Ltd.) with maintaining the electricity-storage element in a thermostatic chamber of 25° C.

A reference current value was set to 0.5 mA, and charge was performed with cut-off voltage of 4.5 V and discharge was performed with cut-off voltage of 1.5 V, and an interval of 5 minutes was provided between charge and discharge, and between the discharge and the following charge.

A combination of the charge and the discharge under the conditions above was determined as 1 cycle, and the charge-discharge test was performed up to 50 cycles. Moreover, a separate electricity-storage element produced in the same manner as above was prepared, and a measurement was performed in the same manner as above under the same measuring conditions. When a discharge capacity of this electricity-storage element at 50th cycle was determined as 100%, the cycle was repeated until a discharge capacity maintaining rate was to be 80% or less. However, the upper limit of the cycle measuring times was set to 1,000 cycles.

<Measurement of Changing Rate of Cross-Sectional Thickness of Positive Electrode Film>

When a changing rate of a cross-sectional thickness of the positive electrode film was measured, a sample to which the charge-discharge test had been performed up to 50 cycles was used to determine a changing rate of the cross-sectional thickness of the positive electrode film. Specifically, at first, a cross-sectional film thickness of the positive electrode film before the charge-discharge cycle test was measured by means of a digital gage (DG-205, available from OZAKI MFG. CO., LTD.).

Next, the positive electrode film was taken out from the electricity-storage element after performing the cycle test, and a thickness of the positive electrode film after the cycle test was measured in the same manner as the measurement before the cycle test. Finally, a changing rate of the cross-sectional thickness defined by Formula (1) below was calculated. Note that, the cross-sectional film thickness of the positive electrode film was an average value of values measured at randomly selected 3 points of the positive electrode film using the digital gage.

$$\text{Changing rate of cross-sectional thickness}(\%) = \frac{\text{Film thickness after charge-discharge} - \text{Film thickness before charge-discharge}}{\text{Film thickness before charge-discharge}} \times 100 \quad \text{Formula (1)}$$

Note that, the methods and conditions for measuring the changing rate of the cross-sectional thickness and the cycle properties were the same in the evaluations of the changing rate of the cross-sectional thickness and the cycle properties in the following series of Examples and Comparative Examples.

The physical properties values of the positive-electrode active material, and as the charge-discharge measurement results, the discharge capacity of the 50th cycle with the reference current value, the changing rate of the thickness, and the number of cycles at the point when the discharge capacity retention rate is 80% or less (cycle service life), when the discharge capacity of the 50th cycle is determined as 100%, are presented in Table 1.

Note that, the BET specific surface area was calculated according to the BET method from the result of adsorption isotherm measured by TriStar3020 (available from Shimadzu Corporation). The pore volume was calculated according to the BJH method. The discharge capacity is a mass conversion value per a unit mass of the positive-electrode active material.

Comparative Example 1

<Production of Positive Electrode>

Black lead powder (KS-6, available from TIMCAL) serving as a positive-electrode active material, acetylene black (Denka Black powder, available from Denka Company Limited) serving as a conduction auxiliary agent, acrylate-based latex (TRD202A, available from JSR Corporation) serving as a binder, and carboxymethyl cellulose (DAICEL 2200, available from Daicel Corporation) serving as a thickening agent were mixed in a manner that a mass ratio of the mixture based on each of the solid contents was to be 100:7.5:3.0:3.8. Water was added to the resultant mixture to adjust the viscosity of the mixture to an appropriate degree, to thereby obtain a slurry. Subsequently, the obtained slurry was applied onto one side of an aluminium foil having a thickness of 20 μm using a doctor blade, and the applied slurry was dried followed by cutting out into a circle having a diameter of 16 mm to thereby obtain a positive electrode.

An average applied amount of the positive-electrode active material in the positive electrode film after drying was 5 mg/cm$^2$.

<Production and Evaluations of Electricity-Storage Element>

An electricity-storage element was produced in the same manner as in Example 1, except that the positive electrode above was used.

A charge-discharge test was performed on the obtained electricity-storage element in the same manner as in Example 1, except that, as the measuring conditions, a reference current value was set to 1.0 mA, charge was performed with cut-off voltage of 5.2 V, discharge was performed with cut-off voltage of 3.0 V, and an interval of 5 minutes was provided between charge and discharge, and between the discharge and the following charge.

Values of physical properties of the positive-electrode active material and the evaluation results are presented in Table 1.

Comparative Example 2

A positive electrode and an electricity-storage element were produced in the same manner as in Comparative Example 1, except that as a positive-electrode active material, activated carbon (BELLFINE AP, available from ATELECTRODE CO., LTD.) was used. Evaluations were performed in the same manner as in Example 1. Values of physical properties of the positive-electrode active material and the evaluation results are presented in Table 1.

Figure 2:
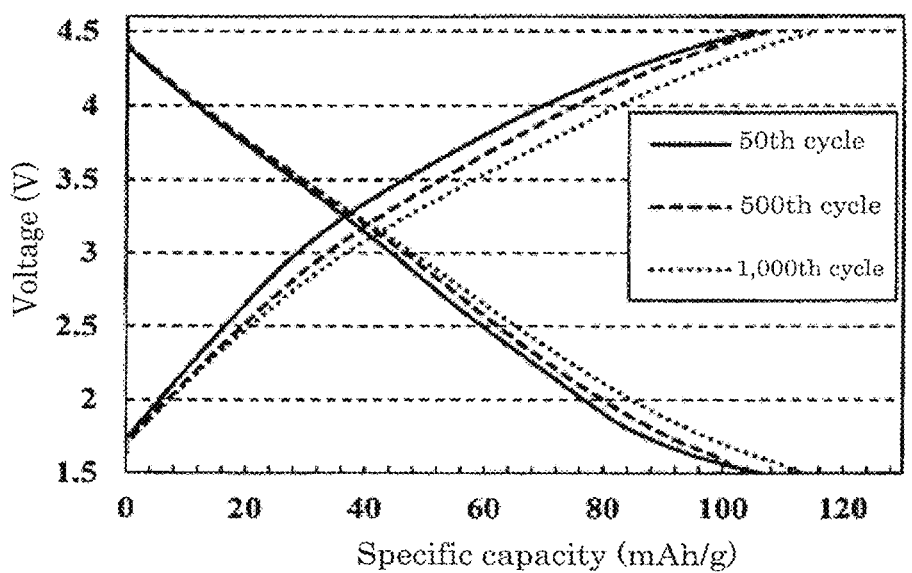
FIG. 2 is a graph depicting charge-discharge curves of the 50th cycle, 500th cycle, and 1,000th cycle of Example 1.
Figure 3:
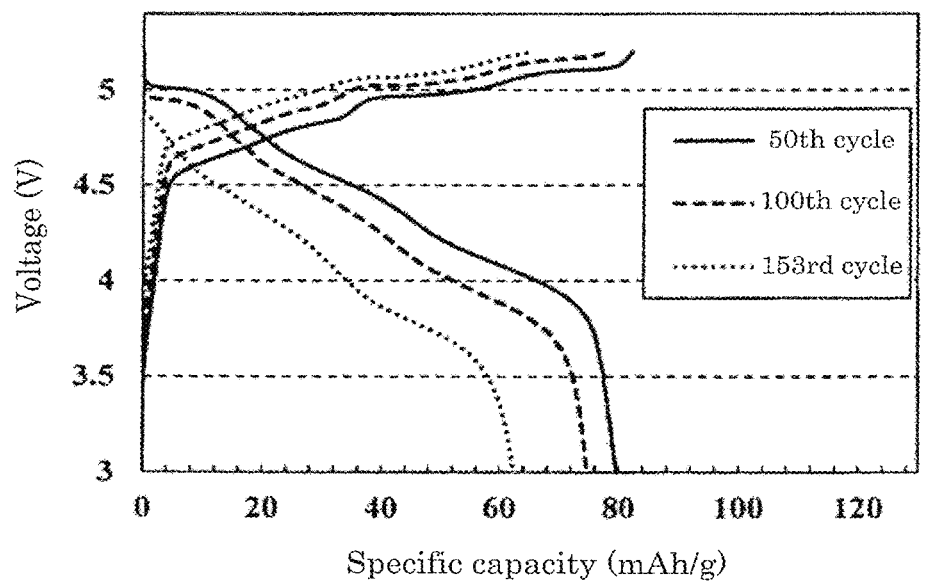
FIG. 3 is a graph depicting charge-discharge curves of the 50th cycle, 100th cycle, and 153rd cycle of Comparative Example 1.
Figure 4:
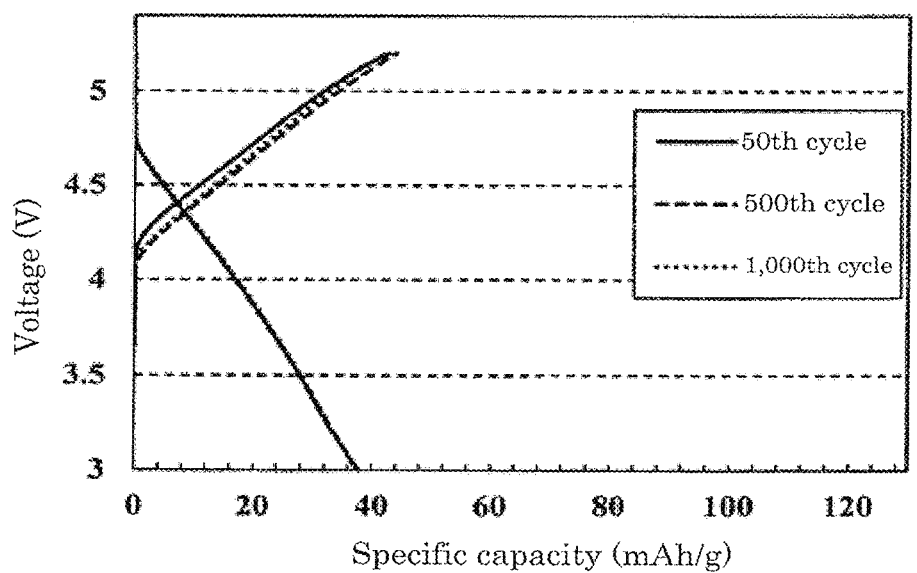
FIG. 4 is a graph depicting charge-discharge curves of the 50th cycle, 500th cycle, and 1,000th cycle of Comparative Example 2.

Charge-discharge curves of cycles of Example 1 are presented in FIG. 2, those of Comparative Example 1 are presented in FIG. 3, and those of Comparative Example 2 are presented in FIG. 4. It was found from the results of Table 1 and FIGS. 2 to 4 that Example 1 of the present disclosure, whereas the positive-electrode active material, the carbon that had pores of a three-dimensional network structure was used and the changing rate of the cross-sectional thickness of the positive electrode film was less than 45%, had the large discharge capacity at the 50th cycle, and the changing rate of the cross-sectional thickness of the positive electrode film was small and hence had excellent cycle properties, compared to Comparative Example 1 where the black lead that did not have pores of a three-dimensional network structure was used. It was assumed that the cycle service life was excellent in Example 1 because the changing rate of the cross-sectional thickness of the positive electrode film was small.

Moreover, in Comparative Example 2 where the activated carbon that did not have pores of a three-dimensional network structure was used, the changing rate of the cross-sectional thickness of the positive electrode film and the cycle properties were excellent, but the discharge capacity was extremely small.

Example 2

A positive electrode and an electricity-storage element were produced in the same manner as in Example 1, except that as a positive-electrode active material, Carbon B (amorphous CNOVEL, available from Toyo Tanso Co., Ltd.) was used. Evaluations were performed in the same manner as in Example 1. Values of physical properties of the positive-electrode active material and the evaluation results are presented in Table 1.

Example 3

A positive electrode and an electricity-storage element were produced in the same manner as in Example 1, except that as a positive-electrode active material, Carbon C (amorphous CNOVEL, available from Toyo Tanso Co., Ltd.) was used. Evaluations were performed in the same manner as in Example 1. Values of physical properties of the positive-electrode active material and the evaluation results are presented in Table 1.

Example 4

A positive electrode and an electricity-storage element were produced in the same manner as in Example 1, except that as a positive-electrode active material, Carbon D (amorphous CNOVEL, available from Toyo Tanso Co., Ltd.) was used. Evaluations were performed in the same manner as in Example 1. Values of physical properties of the positive-electrode active material and the evaluation results are presented in Table 1.

Example 5

A positive electrode and an electricity-storage element were produced in the same manner as in Example 1, except that as a positive-electrode active material, Carbon E (amorphous CNOVEL, available from Toyo Tanso Co., Ltd.) was used. Evaluations were performed in the same manner as in Example 1. Values of physical properties of the positive-electrode active material and the evaluation results are presented in Table 1.

Example 6

A charge-discharge test was performed on the electricity-storage element of Example 1 in the same manner as in Example 1, except that a reference current value was set to 0.5 mA, charge was performed with cut-off voltage of 4.7 V, discharge was performed with cut-off voltage of 1.5 V, and an interval of 5 minutes was provided between charge and discharge, and between the discharge and the following charge. Values of physical properties of the positive-electrode active material and the evaluation results are presented in Table 1.

Example 7

A charge-discharge test was performed on the electricity-storage element of Example 1 in the same manner as in Example 1, except that a reference current value was set to 0.5 mA, charge was performed with cut-off voltage of 4.8 V, discharge was performed with cut-off voltage of 1.5 V, and an interval of 5 minutes was provided between charge and discharge, and between the discharge and the following charge. Values of physical properties of the positive-electrode active material and the evaluation results are presented in Table 1.

Example 8

<Production of Positive Electrode>

Carbon F (crystalline CNOVEL, available from Toyo Tanso CO., Ltd.) serving as a positive-electrode active material, acetylene black (Denka Black powder, available from Denka Company Limited) serving as a conduction auxiliary agent, acrylate-based latex (TRD202A, available from JSR Corporation) serving as a binder, and carboxymethyl cellulose (DAICEL 1270, available from Daicel Corporation) serving as a thickening agent were mixed in a manner that a mass ratio of the mixture based on each of the solid contents was to be 100:7.5:3.0:10. Water was added to the resultant mixture to adjust the viscosity of the mixture to an appropriate degree, to thereby obtain a slurry. Subsequently, the obtained slurry was applied onto one side of an aluminium foil having a thickness of 20 µm using a doctor blade, and the applied slurry was dried followed by cutting out into a circle having a diameter of 16 mm to thereby obtain a positive electrode.

An average applied amount of the positive-electrode active material in the positive electrode film after drying was 2.0 mg/cm$^2$.

<Production and Evaluations of Electricity-Storage Element>

An electricity-storage element was produced in the same manner as in Example 1, except that the positive electrode above was used.

A charge-discharge test was performed on the obtained electricity-storage element in the same manner as in Example 1, except that, as the measuring conditions, a reference current value was set to 1.0 mA, charge was performed with cut-off voltage of 5.2 V, discharge was performed with cut-off voltage of 2.0 V, and an interval of 5 minutes was provided between charge and discharge, and between the discharge and the following charge. Values of physical properties of the positive-electrode active material and the evaluation results are presented in Table 1.

Example 9

A positive electrode and an electricity-storage element were produced in the same manner as in Example 8, except that as a positive-electrode active material, Carbon G (crystalline CNOVEL, available from Toyo Tanso Co., Ltd.) was used. Evaluations were performed in the same manner as in Example 1, except that measuring conditions were the same as in Example 8. Values of physical properties of the positive-electrode active material and the evaluation results are presented in Table 1.

Example 10

A positive electrode and an electricity-storage element were produced in the same manner as in Example 8, except that as a positive-electrode active material, Carbon H (crystalline CNOVEL, available from Toyo Tanso Co., Ltd.) was used. Evaluations were performed in the same manner as in Example 1, except that measuring conditions were the same as in Example 8. Values of physical properties of the positive-electrode active material and the evaluation results are presented in Table 1.

Example 11

A charge-discharge test was performed on the electricity-storage element of Example 8 in the same manner as in Example 1, except that a reference current value was set to 1.0 mA, charge was performed with cut-off voltage of 5.3 V, discharge was performed with cut-off voltage of 2.0 V, and an interval of 5 minutes was provided between charge and discharge, and between the discharge and the following charge. Values of physical properties of the positive-electrode active material and the evaluation results are presented in Table 1.

Example 12

<Production of Positive Electrode>

Carbon I (non-graphitizable CNOVEL, available from Toyo Tanso Co., Ltd.) serving as a positive-electrode active material, acetylene black (Denka Black powder, available from Denka Company Limited) serving as a conduction auxiliary agent, acrylate-based latex (TRD202A, available from JSR Corporation) serving as a binder, and carboxymethyl cellulose (DAICEL 1270, available from Daicel Corporation) serving as a thickening agent were mixed in a manner that a mass ratio of the mixture based on each of the solid contents was to be 100:7.5:3.0:10. Water was added to the resultant mixture to adjust the viscosity of the mixture to an appropriate degree, to thereby obtain a slurry. Subsequently, the obtained slurry was applied onto one side of an aluminium foil having a thickness of 20 µm using a doctor blade, and the applied slurry was dried followed by cutting out into a circle having a diameter of 16 mm to thereby obtain a positive electrode.

An average applied amount of the positive-electrode active material in the positive electrode film after drying was 1.7 mg/cm$^2$.

<Production and Evaluations of Electricity-Storage Element>

An electricity-storage element was produced in the same manner as in Example 1, except that the positive electrode above was used.

An evaluation was performed on the obtained electricity-storage element in the same manner as in Example 1, except that a reference current value was set to 1.0 mA, charge was performed with cut-off voltage of 5.2 V, discharge was performed with cut-off voltage of 2.0 V, and an interval of 5 minutes was provided between charge and discharge, and between the discharge and the following charge. Values of physical properties of the positive-electrode active material and the evaluation results are presented in Table 1.

Example 13

A positive electrode and an electricity-storage element were produced in the same manner as in Example 12, except that as a positive-electrode active material, Carbon J (non-graphitizable CNOVEL, available from Toyo Tanso Co., Ltd.) was used. Evaluations were performed in the same manner as in Example 1, except that measuring conditions were the same as in Example 12. Values of physical properties of the positive-electrode active material and the evaluation results are presented in Table 1.

Example 14

A positive electrode and an electricity-storage element were produced in the same manner as in Example 12, except that as a positive-electrode active material, Carbon K (non-graphitizable CNOVEL, available from Toyo Tanso Co., Ltd.) was used. Evaluations were performed in the same manner as in Example 1, except that measuring conditions were the same as in Example 12. Values of physical properties of the positive-electrode active material and the evaluation results are presented in Table 1.

Example 15

A positive electrode and an electricity-storage element were produced in the same manner as in Example 12, except that as a positive-electrode active material, Carbon L (non-graphitizable CNOVEL, available from Toyo Tanso Co., Ltd.) was used. Evaluations were performed in the same manner as in Example 1, except that measuring conditions were the same as in Example 12. Values of physical properties of the positive-electrode active material and the evaluation results are presented in Table 1.

Example 16

A positive electrode and an electricity-storage element were produced in the same manner as in Example 12, except that as a positive-electrode active material, Carbon M (non-graphitizable CNOVEL, available from Toyo Tanso Co., Ltd.) was used. Evaluations were performed in the same manner as in Example 1, except that measuring conditions were the same as in Example 12. Values of physical properties of the positive-electrode active material and the evaluation results are presented in Table 1.

Example 17

A positive electrode and an electricity-storage element were produced in the same manner as in Example 12, except that as a positive-electrode active material, Carbon N (non-graphitizable CNOVEL, available from Toyo Tanso Co., Ltd.) was used. Evaluations were performed in the same manner as in Example 1, except that measuring conditions were the same as in Example 12. Values of physical properties of the positive-electrode active material and the evaluation results are presented in Table 1.

Example 18

A charge-discharge test was performed on the electricity-storage element of Example 16 in the same manner as in Example 1, except that a reference current value was set to 1.0 mA, charge was performed with cut-off voltage of 4.7 V, discharge was performed with cut-off voltage of 2.0 V, and an interval of 5 minutes was provided between charge and discharge, and between the discharge and the following charge. Values of physical properties of the positive-electrode active material and the evaluation results are presented in Table 1.

Example 19

A charge-discharge test was performed on the electricity-storage element of Example 16 in the same manner as in Example 1, except that a reference current value was set to 1.0 mA, charge was performed with cut-off voltage of 4.8 V, discharge was performed with cut-off voltage of 2.0 V, and an interval of 5 minutes was provided between charge and discharge, and between the discharge and the following charge. Values of physical properties of the positive-electrode active material and the evaluation results are presented in Table 1.

Example 20

A charge-discharge test was performed on the electricity-storage element of Example 16 in the same manner as in Example 1, except that a reference current value was set to 1.0 mA, charge was performed with cut-off voltage of 5.0 V, discharge was performed with cut-off voltage of 2.0 V, and an interval of 5 minutes was provided between charge and discharge, and between the discharge and the following charge. Values of physical properties of the positive-electrode active material and the evaluation results are presented in Table 1.

Example 21

A charge-discharge test was performed on the electricity-storage element of Example 16 in the same manner as in Example 1, except that a reference current value was set to 1.0 mA, charge was performed with cut-off voltage of 5.1 V, discharge was performed with cut-off voltage of 2.0 V, and an interval of 5 minutes was provided between charge and discharge, and between the discharge and the following charge. Values of physical properties of the positive-electrode active material and the evaluation results are presented in Table 1.

Comparative Example 3

<Production of Positive Electrode>

Mesoporous carbon (Carbon, mesoporous, available from Sigma-Aldrich Co. LLC.) serving as a positive-electrode active material, acetylene black (Denka Black powder, available from Denka Company Limited) serving as a conduction auxiliary agent, acrylate-based latex (TRD202A, available from JSR Corporation) serving as a binder, and carboxymethyl cellulose (DAICEL 2200, available from Daicel Corporation) serving as a thickening agent were mixed in a manner that a mass ratio of the mixture based on each of the solid contents was to be 100:7.5:5.8:17.8. Subsequently, the obtained slurry was applied onto one side of an aluminium foil having a thickness of 20 μm using a doctor blade, and the applied slurry was dried followed by cutting out into a circle having a diameter of 16 mm to thereby obtain a positive electrode.

An average applied amount of the positive-electrode active material in the positive electrode film after drying was 2.4 mg/cm².

<Production and Evaluations of Electricity-Storage Element>

An electricity-storage element was produced in the same manner as in Example 1, except that the positive electrode above was used.

Evaluations were performed on the obtained electricity-storage element in the same manner as in Example 1, except that, as the measuring conditions, a reference current value was set to 0.03 mA, and the other measuring conditions were same as in Comparative Example 1. Values of physical properties of the positive-electrode active material and the evaluation results are presented in Table 1.

Comparative Example 4

<Activation Treatment>

Graphitizable carbon (SC Grade, available from SEC CARBON, LIMITED) was baked at 900° C. in an argon atmosphere together with 2.5 parts by mass of potassium hydroxide (KOH) relative to 1 part by mass of the used graphitizable carbon, to thereby obtain an activation-treated carbon material.

A positive electrode and an electricity-storage element were produced in the same manner as in Comparative Example 1, except that as a positive-electrode active material, the activation-treated carbon obtained above was used. Evaluations were performed in the same manner as in Example 1, except that measurement conditions were the same as in Comparative Example 1. Values of physical properties of the positive-electrode active material and the evaluation results are presented in Table 1.

Comparative Example 5

Evaluations were performed on the electricity-storage element of Example 1 in the same manner as in Example 1, except that a reference current value was set to 0.5 mA, charge was performed with cut-off voltage of 4.9 V, discharge was performed with cut-off voltage of 1.5 V, and an interval of 5 minutes was provided between charge and discharge, and between the discharge and the following charge. Values of physical properties of the positive-electrode active material and the evaluation results are presented in Table 1.

Comparative Example 6

Evaluations were performed on the electricity-storage element of Example 8 in the same manner as in Example 1, except that a reference current value was set to 1.0 mA, charge was performed with cut-off voltage of 5.4 V, discharge was performed with cut-off voltage of 2.0 V, and an interval of 5 minutes was provided between charge and discharge, and between the discharge and the following charge. Values of physical properties of the positive-electrode active material and the evaluation results are presented in Table 1.

Comparative Example 7

Evaluations were performed on the electricity-storage element of Example 16 in the same manner as in Example 1, except that a reference current value was set to 1.0 mA, charge was performed with cut-off voltage of 5.3 V, discharge was performed with cut-off voltage of 2.0 V, and an interval of 5 minutes was provided between charge and discharge, and between the discharge and the following charge. Values of physical properties of the positive-electrode active material and the evaluation results are presented in Table 1.

Comparative Example 8

Evaluations were performed on the electricity-storage element of Example 16 in the same manner as in Example 1, except that a reference current value was set to 1.0 mA, charge was performed with cut-off voltage of 5.4 V, discharge was performed with cut-off voltage of 2.0 V, and an interval of 5 minutes was provided between charge and discharge, and between the discharge and the following charge. Values of physical properties of the positive-electrode active material and the evaluation results are presented in Table 1.

Next, the physical properties values of the positive-electrode active materials of Examples 2 to 21 and Comparative Examples 3 to 8, and as the charge-discharge measurement results of each of Examples 2 to 21 and Comparative Examples 3 to 8, the discharge capacity of the 50th cycle with the reference current value, the changing rate of the thickness, and the number of cycles at the point when the discharge capacity retention rate is 80% or less (cycle service life), when the discharge capacity of the 50th cycle is determined as 100%, are presented in Table 1.

Note that, the BET specific surface area was calculated according to the BET method from the result of adsorption isotherm measured by TriStar3020 (available from Shimadzu Corporation). The pore volume was calculated according to the BJH method. The discharge capacity is a mass conversion value per a unit mass of the positive-electrode active material.

TABLE 1

| Sample | Carbon | Presence of 3D network structure | BET specific surface area (m²/g) | Pore capacity (mL/g) | Discharge capacity of 50$^{th}$ cycle (mAh/g) | Changing rate of thickness (%) | Cycle service life (times) |
|---|---|---|---|---|---|---|---|
| Ex. 1 | Carbon A: amorphous | Present | 1,730 | 2.27 | 106 | 13 | 1,000 |
| Ex. 2 | Carbon B: amorphous | Present | 1,991 | 2.30 | 130 | 19 | 892 |
| Ex. 3 | Carbon C: amorphous | Present | 1,490 | 1.40 | 93 | 10 | 1,000 |
| Ex. 4 | Carbon D: amorphous | Present | 503 | 1.13 | 78 | 8 | 1,000 |
| Ex. 5 | Carbon E: amorphous | Present | 2,014 | 2.37 | 47 | 22 | 173 |
| Ex. 6 | Carbon A: amorphous | Present | 1,732 | 2.28 | 138 | 39 | 483 |
| Ex. 7 | Carbon A: amorphous | Present | 1,732 | 2.28 | 141 | 43 | 263 |
| Ex. 8 | Carbon F: crystalline | Present | 1,130 | 1.51 | 96 | 39 | 523 |
| Ex. 9 | Carbon G: crystalline | Present | 800 | 1.03 | 89 | 28 | 811 |
| Ex. 10 | Carbon H: crystalline | Present | 200 | 0.40 | 68 | 21 | 923 |
| Ex. 11 | Carbon F: crystalline | Present | 1,130 | 1.51 | 112 | 43 | 256 |
| Ex. 12 | Carbon I: nongraphitizable | Present | 48 | 0.19 | 48 | 4 | 1,000 |
| Ex. 13 | Carbon J: nongraphitizable | Present | 55 | 0.21 | 66 | 9 | 1,000 |
| Ex. 14 | Carbon K: nongraphitizable | Present | 90 | 0.24 | 73 | 17 | 791 |

TABLE 1-continued

| Sample | Carbon | Presence of 3D network structure | BET specific surface area (m²/g) | Pore capacity (mL/g) | Discharge capacity of 50$^{th}$ cycle (mAh/g) | Changing rate of thickness (%) | Cycle service life (times) |
|---|---|---|---|---|---|---|---|
| Ex. 15 | Carbon L: nongraphitizable | Present | 562 | 0.75 | 89 | 38 | 683 |
| Ex. 16 | Carbon M: nongraphitizable | Present | 860 | 0.98 | 95 | 43 | 563 |
| Ex. 17 | Carbon N: nongraphitizable | Present | 1,100 | 1.45 | 98 | 38 | 628 |
| Ex. 18 | Carbon M: nongraphitizable | Present | 860 | 0.98 | 47 | 10 | 1,000 |
| Ex. 19 | Carbon M: nongraphitizable | Present | 860 | 0.98 | 51 | 14 | 1,000 |
| Ex. 20 | Carbon M: nongraphitizable | Present | 860 | 0.98 | 67 | 25 | 793 |
| Ex. 21 | Carbon M: nongraphitizable | Present | 860 | 0.98 | 82 | 44 | 548 |
| Comp. Ex. 1 | Black lead | Not present | 2.5 | — | 80 | 102 | 153 |
| Comp. Ex. 2 | Activated carbon | Not present | 1,732 | 1.20 | 45 | 7 | 1,000 |
| Comp. Ex. 3 | Mesoporous carbon | Not present | 200 | 0.32 | 40 | 10 | 892 |
| Comp. Ex. 4 | Activation-treated carbon | Not present | 37 | 0.04 | 99 | 116 | 88 |
| Comp. Ex. 5 | Carbon A: amorphous | Present | 1,732 | 2.28 | 145 | 48 | 148 |
| Comp. Ex. 6 | Carbon F: crystalline | Present | 1,130 | 1.51 | 132 | 49 | 35 |
| Comp. Ex. 7 | Carbon M: nongraphitizable | Present | 860 | 0.98 | 121 | 45 | 120 |
| Comp. Ex. 8 | Carbon M: nongraphitizable | Present | 860 | 0.98 | 143 | 47 | 68 |

It was found from the results of Table 1 that Examples 1 to 21 where, as the positive-electrode active material, the carbon having the pores of the three-dimensional network structure was used and the changing rate of the cross-sectional thickness of the positive electrode film was less than 45%, all had a high discharge capacity of the 50th cycle compared to Comparative Examples 2 and 3 where the activated carbon and mesoporous carbon were used, and all had excellent cycle service life compared to Comparative Examples 1 and 4 where the black lead and the activation-treated carbon were used. Specifically, both properties of the high capacity and the long cycle service life were not able to be achieved at the same time when any of the carbons of Comparative Examples 1 to 4 were used as the active material, but the both properties were achieved with the high values in Examples 1 to 21.

The discharge capacity of each of Examples 1 to 21 is preferably 50 mAh/g or greater that is a superior difference to the discharge capacity of Comparative Example 2. As the discharge capacity increases, moreover, the changing rate of the cross-sectional thickness of the positive electrode film tends to be large, leading to degradation of the cycle service life. In Example 7, particularly, the value of the cycle service life was significantly lower than the values in other Examples. Based on the results above, the discharge capacity is preferably 140 mAh/g or lower.

As the values of the BET specific area and the pore capacity of each of Examples 1 to 21 decrease, moreover, the value of the discharge capacity tends to decrease. In Example 12, particularly, the value of the discharge capacity of the 50th cycle was slightly larger than the value of Comparative Example 2, and was not a satisfactory level. Based on the results above, the BET specific surface area is preferably 50 m²/g or greater and the pore volume is preferably 0.2 mL/g or greater.

As the values of the BET specific surface area and the pore volume increase, the value of the discharge capacity tends to increase. However, the value of the discharge capacity decreases and the cycle service life is shortens when the values of the BET specific area and the pore volume are too large as in Example 5. The value of the discharge capacity of the 50th cycle of Example 5 was similar to the value of Comparative Example 2. Based on the results above, the BET specific surface area is preferably 2,000 m²/g or less and the pore volume is preferably 2.3 mL/g or less.

In all of Comparative Examples 5 to 8 where the carbon having the three-dimensional network structure was used as the positive-electrode active material but the changing rate of the cross-sectional thickness of the positive electrode film was 45% or greater, cycle service life was shortened. The reason for this was assumed that the connection between materials constituting the electrodes was cut by the expansion and contraction of the electrode film when anions were intercalated to the active material, and hence internal resistance was increased. Based on the results above, it was found that the non-aqueous electrolyte electricity-storage element, which utilized insertions of anions to the positive electrode, maintained a high energy density, and had excellent cycle properties with inhibiting expansion of the positive electrode, was able to be provided.

For example, embodiments of the present disclosure are as follows.

<1> A non-aqueous electrolyte electricity-storage element including:
a positive electrode including a positive-electrode active material capable of inserting and releasing anions;
a negative electrode including a negative-electrode active material capable of inserting and releasing cations; and
a non-aqueous electrolyte, wherein the positive-electrode active material is porous carbon having pores having a three-dimensional network structure, and wherein a changing rate of a cross-sectional thickness of a positive electrode film including the positive-electrode active material defined by Formula (1) below is less than 45%

$$\text{Changing rate of cross-sectional thickness}(\%) = \frac{\text{Film thickness after charge-discharge} - \text{Film thickness before charge-discharge}}{\text{Film thickness before charge-discharge}} \times 100. \quad \text{Formula (1)}$$

<2> The non-aqueous electrolyte electricity-storage element according to <1>,
wherein the changing rate of the cross-sectional thickness is 20% or less.
<3> The non-aqueous electrolyte electricity-storage element according to <1> or <2>,
wherein a discharge capacity of the non-aqueous electrolyte electricity-storage element under charge-discharge conditions of the non-aqueous electrolyte electricity-storage element is 50 mAh/g or greater but 140 mAh/g or less.
<4> The non-aqueous electrolyte electricity-storage element according to any one of <1> to <3>,
wherein a BET specific surface area of the porous carbon is 50 m$^2$/g or greater but 2,000 m$^2$/g or less, and a pore volume of the porous carbon is 0.2 mL/g or greater but 2.3 mL/g or less.
<5> The non-aqueous electrolyte electricity-storage element according to any one of <1> to <4>,
wherein the pores of the three-dimensional network structure of the porous carbon are mesopores.
<6> The non-aqueous electrolyte electricity-storage element according to any one of <1> to <5>,
wherein the non-aqueous electrolyte is formed by dissolving a lithium salt in a non-aqueous solvent.
<7> The non-aqueous electrolyte electricity-storage element according to <6>,
wherein the non-aqueous solvent is at least one selected from the group consisting of dimethyl carbonate (DMC), ethylene carbonate (EC), and fluoroethylene carbonate (FEC).
<8> The non-aqueous electrolyte electricity-storage element according to <6> or <7>, wherein the lithium salt is LiPF$_6$.
The non-aqueous electrolyte electricity-storage element according to any one of <1> to <8> can solve the above-described various problems in the art and can achieve the object of the present disclosure.

What is claimed is:
1. An electrode film comprising a porous carbon having connecting mesopores which have a three-dimensional network structure,
wherein a changing rate of a cross-sectional thickness of the electrode film including the porous carbon is less than 45%,
wherein the changing rate of the cross-sectional thickness is measured by: mixing the porous carbon, acetylene black, an acrylate-based latex, and carboxymethyl cellulose in a mass ratio of the porous carbon, the acetylene black, the acrylate-based latex, and the carboxymethyl cellulose based on each of solid contents is 100:7.5:3.0:9.5, to obtain a mixture; adding water to the mixture to obtain a slurry; applying the slurry onto one side of an aluminum foil; drying the applied slurry; cutting the dried slurry into a circle having a diameter of 16 mm to obtain the electrode film; and measuring the changing rate of the cross-sectional thickness defined by Formula (1),

$$\text{Changing rate of cross-sectional thickness}(\%) = \frac{\text{Film thickness after charge-discharge} - \text{Film thickness before charge-discharge}}{\text{Film thickness before charge-discharge}} \times 100, \quad \text{Formula (1)}$$

wherein the charge-discharge in the Formula (1) is 50 cycles charge-discharge where charge is performed with cut-off voltage of 4.5V and discharge is performed with cut-off voltage of 1.5V.
2. The electrode film according to claim 1,
wherein the changing rate of the cross-sectional thickness is 20% or less.
3. The electrode film according to claim 1,
wherein the porous carbon is suitable for a non-aqueous electrolyte electricity-storage element, in which a discharge capacity of the non-aqueous electrolyte electricity-storage element under charge-discharge conditions of the non-aqueous electrolyte electricity-storage element is 50 mAh/g or greater but 140 mAh/g or less.
4. The electrode film according to claim 1,
wherein a BET specific surface area of the porous carbon is 50 m$^2$/g or greater but 2,000 m$^2$/g or less, and a pore volume of the porous carbon is 0.2 mL/g or greater but 2.3 mL/g or less.
5. The electrode film according to claim 1,
wherein a BET specific surface area of the porous carbon is 800 m$^2$/g or greater but 1,800 m$^2$/g or less, and a pore volume of the porous carbon is 0.2 mL/g or greater but 1.7 mL/g or less.
6. The electrode film according to claim 1,
wherein a diameter of the mesopores is 2 nm or greater but 50 nm or less.

* * * * *